Feb. 25, 1969  E. R. HARRIS  3,429,290
WARNING BELL FOR VEHICLES MOVING IN REVERSE
Filed July 26, 1966
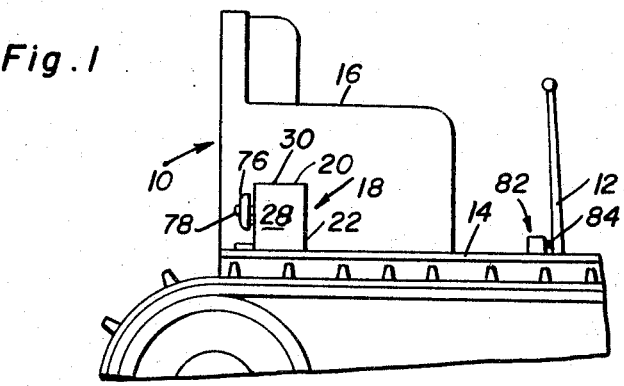
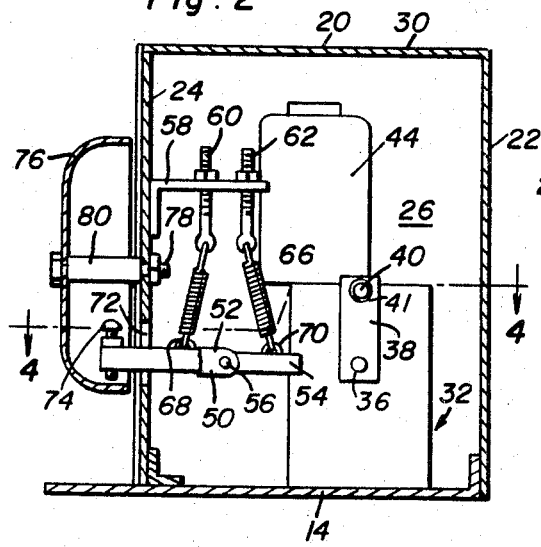
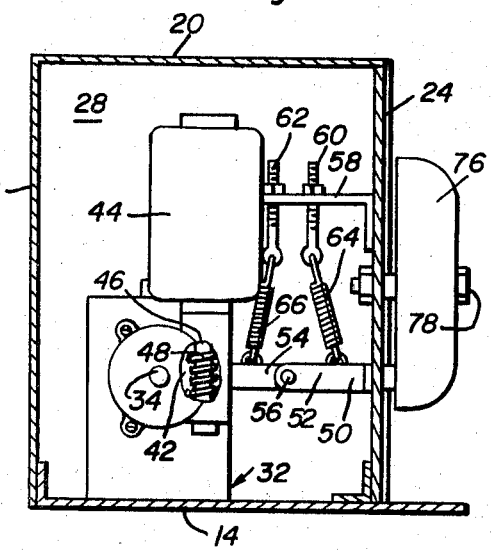
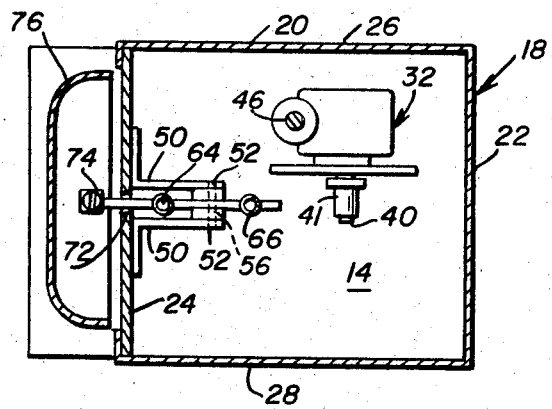
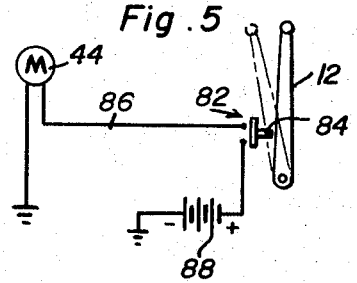
Earl R. Harris
INVENTOR.
BY *Clarence A. O'Brien*
and *Harvey B. Jacobson*
Attorneys

United States Patent Office

3,429,290
Patented Feb. 25, 1969

3,429,290
WARNING BELL FOR VEHICLES MOVING
IN REVERSE
Earl R. Harris, 2302 Onalaska Ave.,
La Crosse, Wis. 54601
Filed July 26, 1966, Ser. No. 568,018
U.S. Cl. 116—60         2 Claims
Int. Cl. B60q 5/00, 1/26; H01h 9/06

ABSTRACT OF THE DISCLOSURE

A warning bell assembly for vehicles including a motorized actuator operable to intermittently produce bell sounds. The warning bell assembly includes a control for the motor thereof to be operatively associated with the gear shift of a vehicle upon which the warning bell assembly is mounted for actuation of the control in response to the gear shift lever of the vehicle being placed in the reverse gear position.

---

This invention relates to a novel and a useful warning bell system for vehicles and more specifically to a warning bell system adapted to be actuated when an associated vehicle is moving in reverse.

The warning bell of the instant invention includes actuating means in the form of an electric motor and a control switch for the electric motor adapted to be operatively associated with the gear shift of the associated lever so as to actuate the electric motor in direct response to the gear shift being placed in the reverse gear position. Therefore, not only is the warning bell of the instant invention adapted to be actuated when a vehicle is moving in reverse, but also when the vehicle is about to be moved in reverse.

The main object of this invention is to provide a dependable warning bell system for vehicles adapted to be actuated when an associated vehicle is being moved or about to be moved in reverse.

Another object of this invention, in accordance with the immediately preceding object, is to provide a warning bell system constructed in a manner whereby it may be readily mounted upon and operatively connected to the gear shifting mechanism of substantially any vehicle.

A final object of this invention to be specifically enumerated herein is to provide a warning bell which will conform to conventional forms of manufacture, be of simple construction and easy to install so as to provide a device that will be economically feasible, long lasting and trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a vehicle with the warning bell of the instant invention illustrated operatively supported therefrom and the actuating switch assembly for the warning bell operatively associated with the gear shift lever of the vehicle;

FIGURE 2 is an enlarged vertical sectional view taken substantially upon a plane passing through the center of the warning bell;

FIGURE 3 is an enlarged fragmentary vertical sectional view taken substantially upon a plane paralleling the plane upon which FIGURE 2 is taken but looking in the opposite direction;

FIGURE 4 is a horizontal sectional view taken substantially upon the plane indicated by the section line 4—4 of FIGURE 2; and FIGURE 5 is a diagrammatical view of the electrical circuit for the motor of the warning bell illustrating the manner in which the gear shift lever of the vehicle may be shifted into the reverse position so as to close the motor actuating switch.

Referring now more specifically to the drawings the numeral 10 generally designates a form of construction vehicle including a gear shift control 12 and a body portion 14 from which an operator's seat 16 is supported.

The warning bell of the instant invention is generally referred to by the reference numeral 18 and includes a housing 20 supported from the body 14. The housing 20 includes front and rear upstanding walls 22 and 24 and opposite side walls 26 and 28 interconnected at their upper ends by means of a top wall 30. A gear reduction assembly generally referred to by the reference numeral 32 is disposed within the housing 20 and supported from the body 14. The gear reduction assembly 32 includes an input shaft 34 drivingly coupled to an output shaft 36 having a crank arm 38 mounted thereon including a laterally directed striker pin 40, the pin 40 having a wear sleeve 41 journalled thereon adjacent its free end. Mounted on the input shaft 34 is a worm wheel 42 and an electric motor 44 supported from the gear reduction assembly 32 includes an output shaft 46 having a worm gear 48 mounted thereon meshed with the worm wheel 42.

A pair of L-shaped mounting brackets 50 are supported on the rear wall 24 in any convenient manner and include forwardly projecting flange supports 52 between which a lever arm 54 is pivotally supported intermediate its opposite ends by means of a pivot pin 56.

An additional L-shaped support bracket 58 is supported from the rear wall 24 above the L-shaped brackets 50 in any convenient manner and includes a plurality of vertically adjustable anchor screws 60 and 62. A pair of expansion springs 64 and 66 have one pair of corresponding ends secured to the anchor screws 60 and 62, respectively, and the other pair of ends thereof suitably secured to the lever arm 54 on opposite sides of the pivot pin 56 as at 68 and 70. The free end of the lever arm 54 to which the expansion spring 64 is connected projects through a slot 72 provided therefor in the rear wall 24 and has an adjustable clapper screw 74 threadedly engaged with the terminal end portion thereof. The clapper screw 74 is disposed within a dish-shaped bell member 76 supported from the rear wall 24 by means of a suitable fastener 78 encircled by a suitable spacer sleeve 80.

The wear sleeve 41 on the striker pin 40 upon rotation of the output shaft 36 and thus swinging movement of the crank 38, is engageable with the end of the lever arm 54 to which the expansion spring 66 is secured so as to downwardly deflect that end of the lever arm 54 and thus upwardly deflect the end of the lever arm 54 from which the clapper screw 74 is supported. As soon as the striker pin 40 passes the adjacent end of the lever arm 54 the expansion spring 66 will rapidly swing the lever arm 54 back toward its centered position illustrated in FIGURE 2 of the drawings and the inertia of the swinging lever arm 54 will carry it past the centered position for engagement of the clapper screw 74 with the bell member 76. Accordingly, actuation of the motor 44 will cause the bell member 76 to be intermittently struck by the clapper screw 74.

With attention now invited more specifically to FIGURE 1 of the drawings and also to FIGURE 5, a switch assembly generally referred to by the reference numeral 82 is supported from the body 14 adjacent the gear shift control 12 and includes an actuator 84 adapted for engagement by the gear shift control 12 when the latter is placed in the reverse gear position. Engagement of the gear shift control 12 with the actuator 84 will urge the latter inwardly away from its outermost projecting position in which the switch or switch assembly 84 is open and thus cause the electrical circuit 86 to be closed and to electrically connect the vehicle battery 88 to the motor 44. Accordingly, anytime the gear shift lever 12 is placed in the reverse position, either during reversing movement of the vehicle 10 or preparatory to the vehicle 10 being moved in reverse, the bell member 76 will be intermittently struck by the clapper screw 74 to warn persons adjacent the vehicle 10 that the latter is moving in reverse or about to be moved in reverse.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A warning bell assembly including a housing adapted for support from a vehicle including a gear shift lever shiftable to a reverse gear position, a dish-shaped bell member supported from one wall of the housing in slightly spaced relation relative to said one wall and with the bell member opening toward said one wall, an opening formed in said wall, a pair of L-shaped mounting brackets including base flange portions projecting in opposite directions and secured to the inner surface of said one wall on opposite sides of said opening, said mounting brackets including generally parallel mounting flange portions projecting inwardly from said one wall on opposite sides of the longitudinal center line of said opening, a lever arm pivotally supported between the free ends of the mounting flange portions of said bracket for oscillation about an axis extending between the free ends of said mounting flange portions and transversely of said lever arm centrally intermediate its opposite ends with said lever arm generally paralleling said mounting flange portions and disposed therebetween with one end thereof projecting outwardly through said opening and spaced slightly inwardly of and at least substantially enclosed by a peripheral portion of said bell member, a clapper stationarily supported from said one end of said lever arm, a pair of elongated expansion springs including one pair or corresponding end portions anchored to opposite end portions of said lever arm, a pair of adjustable achor members supported interiorly of said housing to which the other pair of corresponding ends of said expansion springs are secured, said expansion springs yielding biasing said lever arm in opposite directions of rotation and applying equal forces on said lever arm to urge the latter to a rest position with said clapper slightly spaced and disposed inwardly of said peripheral portion of said bell member, a support disposed within said housing, a rotary member journalled from said suport, and an electric motor supported from said support and drivingly connected to said rotary member, said rotary member benig journalled for rotation about an axis generally paralleling the axis of oscillation of said lever arm, said rotary member including an eccentrically disposed abutment swingable, upon rotation of said rotary member, into engagement with the inner end of said lever arm remote from said clapper to swing said lever arm in a direction of rotation thereof moving said clapper generally radially inwardly of said dish-shaped bell member from said peripheral portion thereof and thereafter swingable out of engagement with said inner end of said lever arm to release the latter for swinging movement under the biasing action of said springs in the opposite direction past said rest position and into a position with said clapper abutted against said peripheral portion of said bell member, electric circuit means for said motor in which the latter is serially connected, said electric circuit means including normally open switch means serially connected therein and including an actuator adapted to be engaged by said shift lever to close said switch means in response to movement of said shift lever to said reverse position.

2. The combination of claim 1 wherein said clapper is supported from the corresponding end of said lever arm for adjustable positioning relative to said lever arm toward and away from said peripheral portion of said bell member.

References Cited

UNITED STATES PATENTS

| 1,251,919 | 1/1918 | Priester | 116—60 |
| 1,374,432 | 4/1921 | Clay | 116—167 |
| 1,664,871 | 4/1928 | Werder | 116—25 |
| 1,901,320 | 3/1933 | Mortenson | 200—61.88 |
| 2,979,020 | 4/1961 | Radics | 116—57 |
| 3,048,142 | 8/1962 | Warm | 116—60 |
| 3,076,960 | 2/1963 | Knutson | 340—392 |

FOREIGN PATENTS 893,291 1/1944 France.

LOUIS I. CAPOZI, *Primary Examiner.*

U.S. Cl. X.R.

200—61.88; 340—70